United States Patent [19]

Possati et al.

[11] 4,443,947

[45] Apr. 24, 1984

[54] PLUG COMPARATOR FOR CHECKING THE DIAMETER OF HOLES

[75] Inventors: Mario Possati; Guido Golinelli, both of Bologna; Narciso Selleri, Monteveglio, all of Italy

[73] Assignee: Finike Italiana Marposs S.p.A., S. Marino di Bentivoglio, Italy

[21] Appl. No.: 268,632

[22] Filed: May 29, 1981

[30] Foreign Application Priority Data

Jun. 2, 1980 [IT] Italy .................. 3437 A/80

[51] Int. Cl.³ ............................................. G01B 5/12
[52] U.S. Cl. ................. 33/178 E; 33/147 K; 33/148 H
[58] Field of Search ............. 33/178 R, 178 E, 178 F, 33/172 E, 172 B, 147 K, 148 H, 147 N, 143 L, 149 J; 220/307, 319, 320, 305; 16/2

[56] References Cited

U.S. PATENT DOCUMENTS

| | | | |
|---|---|---|---|
| 1,285,755 | 11/1918 | McCuen | 220/305 X |
| 2,019,287 | 10/1935 | Bates | 33/178 R |
| 2,064,028 | 12/1936 | Moyer | 220/319 X |
| 2,403,546 | 7/1946 | Olsen . | |
| 2,638,681 | 5/1953 | Kinley et al. . | |
| 2,790,462 | 4/1957 | Ashton | 220/319 X |
| 3,336,555 | 8/1967 | Pastan | 134/166 R |
| 3,808,696 | 5/1974 | Possati . | |
| 3,943,632 | 3/1976 | Albertazzi . | |
| 4,030,202 | 6/1977 | Fadl | 33/178 E |
| 4,077,130 | 3/1978 | Possati . | |
| 4,175,402 | 11/1979 | Hile | 16/2 X |
| 4,279,079 | 7/1981 | Gamberini et al. | 33/149 J |
| 4,290,204 | 9/1981 | Possati | 33/147 K X |
| 4,306,455 | 12/1981 | Selleri . | |

FOREIGN PATENT DOCUMENTS

1535816 7/1968 France .
1010553 10/1977 Italy .

*Primary Examiner*—Harry N. Haroian
*Attorney, Agent, or Firm*—Stevens, Davis, Miller & Mosher

[57] ABSTRACT

A plug comparator for checking the diameter of holes of mechanical parts comprising a support, a movable measurement unit and a protection casing.

The movable measurement unit comprises two movable arms bearing respective feeler elements which come into contact with the part to be checked.

A position transducer detects the position of the movable arms and is connected by an electric cord to an electric supply and indication group.

The casing has a lower base with a frustoconical seat for the fitted housing of a closure plate. The closure plate has a cut in diametral direction which subdivides it into two adjacent portions connected by a third portion which is elastically yieldable so as to permit fitting the closure plate in the frustoconical seat.

4 Claims, 11 Drawing Figures

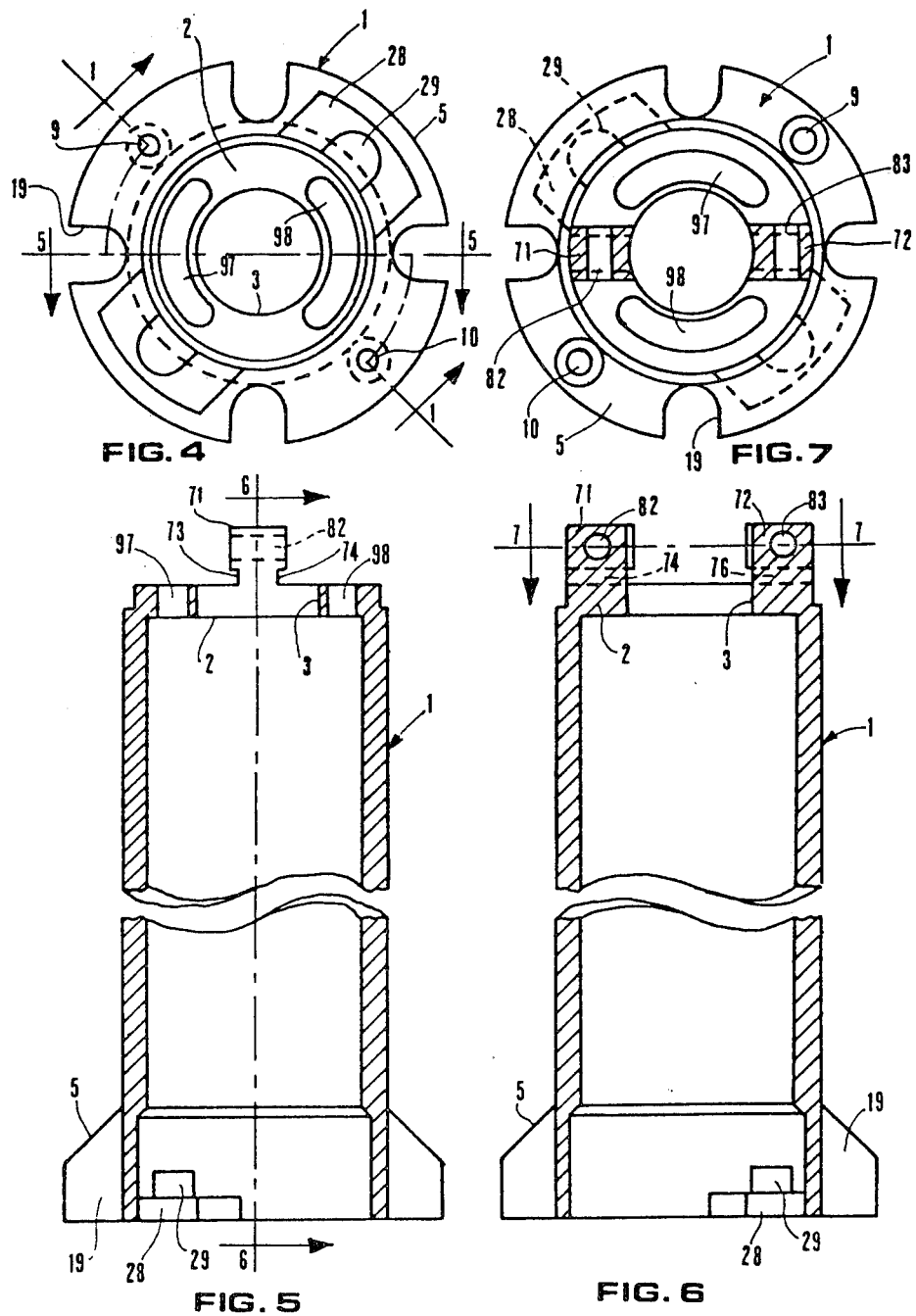

PLUG COMPARATOR FOR CHECKING THE DIAMETER OF HOLES

The present invention relates to a plug comparator for checking the diameter of holes in mechanical parts, comprising support and protection means which define an outer housing and a casing or nose with a substantially circular base plate; a seat for the plate; two movable arms supported by the support and protection means and housed within the housing; two feeler elements fastened respectively to the movable arms and passing through respective openings of the nose to come into contact with diametrically opposite points of the part to be checked; and transducer means adapted to detect the position of the movable arms.

BACKGROUND OF THE INVENTION

The traditional plug comparators have a protection and support structure including a casing or nose which has openings for the passage of the feeler elements. The feeler elements are fastened in an adjustable manner to the arms in order to permit the use of the comparator in different measurement ranges. This adjustability may also require the use of different casings.

To the base of the nose there is usually fastened by screws a closure plate which has the two-fold purpose of mechanically protecting the inner elements of the comparator and of reducing the possibility of foreign matter, for instance, chips, powder and cooling liquids used in the machining of the parts, from accidentally entering the comparator.

SUMMARY OF THE INVENTION

The object of the invention is to provide a plug comparator which involves a reduced cost of manufacture as compared with that of the traditional comparators and which makes it possible to simplify the assembly and maintenance operations.

This object is achieved by means of a plug comparator of the type indicated at the start of the present specification in which, in accordance with the invention, the base plate has a cut substantially in diametral direction which divides it into two adjacent portions connected by a third portion, the third portion being elastically yieldable so as to permit bringing the first two portions together in order to insert the plate into the seat and effect a fitted connection of the plate to the seat.

BRIEF DESCRIPTION OF THE DRAWINGS

Other objects and advantages will become evident from the following description of a comparator according to the preferred embodiment of the invention which is illustrated in the accompanying drawings, which are purely illustrative and not limitative and in which:

FIG. 4 is a bottom view of a handle of the comparator of FIG. 1;

FIG. 5 is a longitudinal sectional view through the handle along line 5—5 of FIG. 4;

FIG. 6 is a longitudinal sectional view through the handle along line 6—6 of FIG. 5;

FIG. 7 is a horizontal sectional view, seen from above the handle along line 7—7 of FIG. 6;

DESCRIPTION OF THE PREFERRED EMBODIMENT

Figure 1:
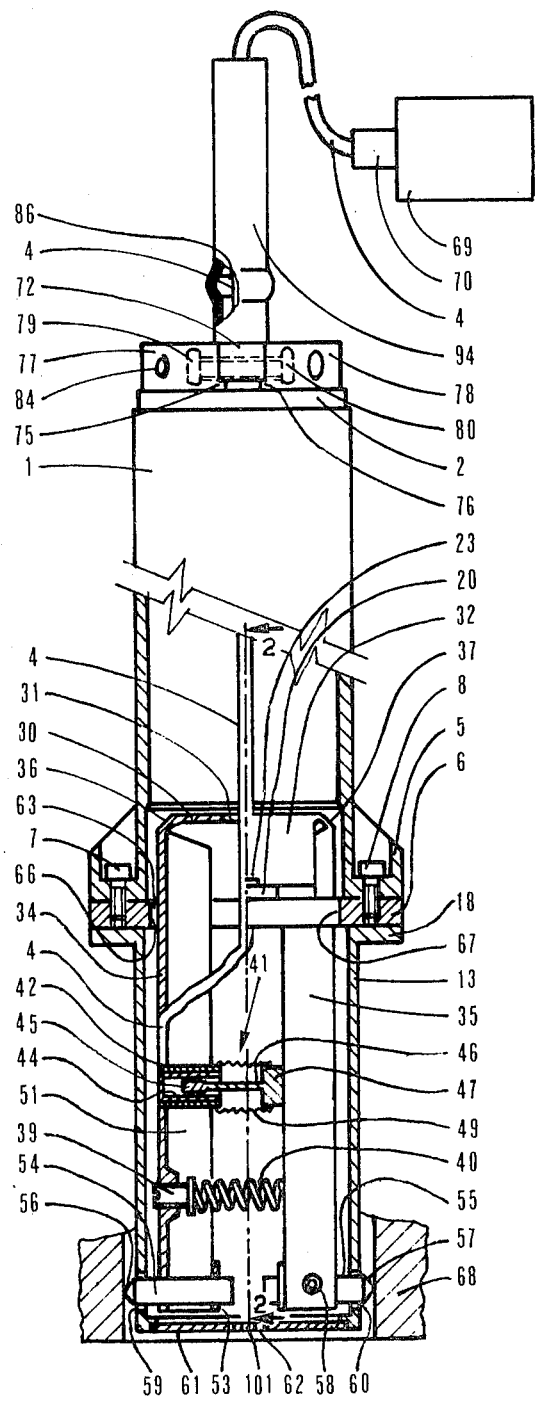
FIG. 1 is a longitudinal view, partially in section, of a manual plug comparator in accordance with the preferred embodiment of the invention taken along line 1—1 of FIG. 4.

Referring to FIGS. 1 to 6, the manual plug comparator comprises a handle 1, preferably of plastic material, having an upper base 2 which is perpendicular to the longitudinal axis of the comparator and has a central aperture or hole 3 (FIG. 5) for the passage of an electrical cord 4. The handle 1, which is hollow on the inside, has substantially cylindrical inner and outer surfaces coaxial with the longitudinal axis of the comparator. The lower part of the handle 1 terminates in a flange 5 which serves to connect the handle to a support element consisting essentially of a perforated plate 6. The connection between the flange 5 and the plate 6 is effected by means of two screws 7, 8 which pass through holes 9, 10 in the flange 5 (FIG. 4) and are threaded in threaded holes 11, 12 in the plate 6 (FIG. 3) so as to clamp the lower face of the flange 5 to the upper face of the plate 6.

The plate 6 furthermore supports a protection and centering casing 13 by means of four screws, not visible in the drawing, which pass through holes 14, 15, 16, 17 of the plate 6 and are threaded in threaded holes, not visible in the drawing, provided in a flange 18 of the casing 13 in such a manner that the upper face of the flange 18 is clamped to the lower face of the plate 6. The four fastening holes of the flange 18 are accessible through openings 19 in the flange 5 (FIG. 4).

The plate 6 furthermore acts as a support element for the movable unit of the comparator. To the upper face of the plate 6 there are connected the lower faces of two flanges 20, 21 (FIG. 2) which form a single body 22 with the movable unit. The connection is effected by means of two screws, one of which, 23, is visible in FIG. 1, passing through holes 24, 25 in the flanges 20, 21 and which are threaded into threaded holes 26, 27 of the plate 6. In the flange 5 there are provided seats 28, 29 for housing the flanges 20, 21 and the screws 23 (FIG. 4).

Figure 3:
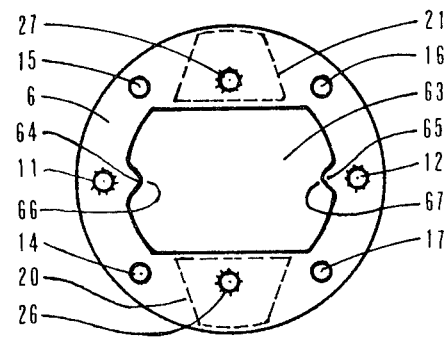
FIG. 3 is a plan view of a support element of the comparator of FIG. 1.

The flanges 20, 21, shown partially in dashed line in FIG. 3, are opposite each other with respect to the vertical plane passing through the axis of the comparator and through the axes of the holes 11 and 12.

The body 22, which is obtained by bending a plate of spring steel, furthermore comprises an upper base 30 of substantially rectangular perimeter and with a hole 31 for the passage of the electrical cord 4, two connecting parts 32, 33 between the flanges 20, 21 and the base 30, and two movable arms 34, 35. The arms 34, 35 are obtained by bending two flanges from the steel plate and are connected with the upper base 30 by two portions 36, 37 which are lightened by chamfers, as can be noted from FIG. 1, which form two fulcrums for the rotation of the arms 34, 35 around respective axes perpendicular to the arms.

The structure of the arms 34, 35 is substantially similar and therefore only arm 34 will be described, with reference to FIGS. 1 and 2. The arm 34 is of a C-shaped cross section so as to present high resistance to flexure and has a threaded hole 38 in which there is threaded a screw 39 (FIG. 1) which supports one end of a spring 40, the other end of which is duly fastened to the arm 35. The spring 40 works in compression and therefore tends to open arms 34, 35. The mutual position of the two arms 34, 35 is detected by means of a position transducer 41 with a differential transformer.

The transducer 41 comprises a cylindrical housing 42 inserted into a hole 43 of the arm 34 and fastened to arm 34.

The housing 42 contains within it the primary and secondary windings of the differential transformer. Within the windings 44 there is movable, as a result of the mutual displacements of the arms 34, 35, a magnetic core 45 supported by a shaft 46 integral with a cylinder 47 fastened to the arm 35. The cord 4, which is connected to the windings 44, emerges laterally from the housing 42 and passes through an opening 48 in the arm 34 communicating with the hole 43. An elastic bellows gasket 49 having its ends fastened to the cylinder 47 and to the housing 42 assures tightness within the transducer 41.

The arms 34, 35, as already stated, are of a C-shaped cross section and therefore have bent flanges 50, 51. The arms 34, 35 house at their free ends, in suitable holes 52 passing through further bent flanges 53, cylinders 54, 55 which bear feelers 56, 57, respectively. The cylinders 54, 55 are locked by screws 58 with hollow hexagonal heads which make it possible to adjust the radial position of the cylinders and therefore of the feelers 56, 57.

The casing 13 has holes 59, 60 for the passage of the feelers 56, 57 and is closed on the bottom by a circular base or plate 61 perpendicular to the geometrical axis of the comparator. The plate 61, which is fastened to the casing 13 in a manner which will be described further below, has a central hole 62.

The plate 6 (FIG. 3) is of substantially ring shape with a central hole 63 and has two inwardly protruding parts 64, 65 having approximately the shape of triangular prisms with chamfered vertices 66, 67. The two parts 64, 65, which are diametrically opposite each other in a direction perpendicular to that in which the two flanges 20, 21 are arranged, form stop surfaces adapted to limit the opening stroke of the arms 34, 35. As a matter of fact, as can be noted also from FIG. 1, the arms 34, 35 pass through the hole 63 since the base 30 and the free ends of the arms are on opposite sides of the plate 6. At the level of the plate 6, the central part of the C-shaped section of the arms 34, 35 is adjacent the vertices 66, 67.

Figure 2:
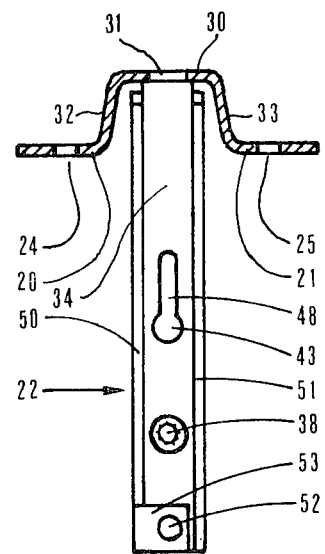
FIG. 2 is a longitudinal sectional view through the movable unit of the comparator of FIG. 1, along the line 2—2 of FIG. 1.

Therefore, if the part 68 to be checked shown in FIG. 1 is removed, the opening movement determined by the spring 40 is limited due to the contact of the central part of the C-shaped section of the arms 34, 35 with the vertices 66, 67.

On the other hand, when the casing 13 is introduced into a hole of a part 68 to be checked, the feelers 56, 57, which in condition of rest protrude with respect to the surface of the casing 13 by a predetermined amount, cause the arms 34, 35 to close, bringing them into measurement position, and it is possible to read from an instrument of a supply and detection group 69 connected to a connector 70 fastened to the end of the electrical cord 4, the difference between the diameter of the hole and the value of the diameter of a sample part by means of which, as is customary, the zero setting of the comparator is effected.

From the above description it can be noted that a single element, namely the plate 6, acts both as a central support to which there are connected the handle 1, the arms 34, 35 (via the intermediate support element comprising the flanges 20, 21, the base 30 and the lightened sections 36, 37) and the casing 13 and as a limiter of the opening stroke of the arms 34, 35.

The limiting of the opening stroke is obtained, as described above, by two parts of the plate or ring 6 which protrude towards the inside and which, terminating with substantially sharp-edged surfaces, define stop surfaces of small size, so as to eliminate the influence of foreign elements which may tend to deposit on the arms 34, 35 or on the stop surfaces 66, 67 and to assure a limiting of the opening stroke to a constant value. The vertices which constitute the stop surfaces may be more or less beveled or sharp, depending on the shape of the arms 34, 35.

The handle 1, above the upper base 2, has two tangs 71, 72 of substantially prismatic shape but with two faces having the shape parts of cylindrical surfaces of the same diameter as the base 2 of the handle 1. In the lower part of the tang 71 there are provided two opposite undercuts 73, 74 (FIGS. 5, 6). Similar undercuts 75, 76 are provided in the tang 72 (FIGS. 1 and 6).

Figure 8:
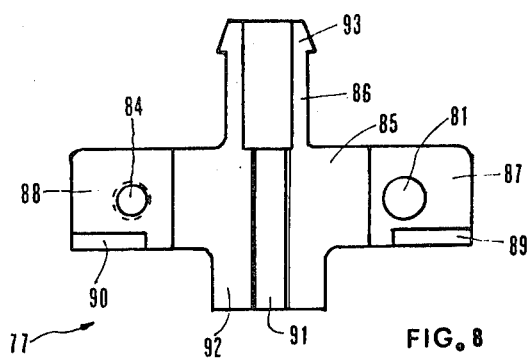
FIG. 8 is an elevational view on an enlarged scale of an element of a cord-holder device of the comparator of FIG. 1.
Figure 9:
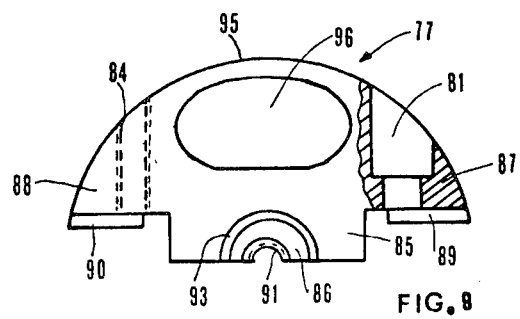
FIG. 9 is a plan view, partially in section, of the element of FIG. 8.

The comparator furthermore comprises a cordholder device consisting of two elements 77, 78 which are clamped by screws 79, 80 against the tangs 71, 72, as is visible in FIG. 1. The screw 79 passes through a hole 81 in the element 77 (FIGS. 8, 9) a hole 82 in the tang 71 and is screwed into a threaded hole of the element 78. In a similar manner, the screw 80 passes through a hole in the element 78 and a hole 83 in the tang 72 and is screwed into a threaded hole 84 of the element 77.

The element 77, which is identical to the element 78, comprises a central body 85, a semitubular part 86 and two lateral arms 87, 88. The arms 87, 88 in which holes 81, 84 are present have two teeth 89, 90 adapted to be inserted into the undercuts 73, 75 of the tangs 71, 72 which define stop surfaces cooperating with the teeth 89, 90, so as to prevent displacement of the element 77 in the axial direction of the comparator. Within the central body 85 there is provided a semicylindrically threaded seat 91 coaxial with the semitubular part 86.

When the cord-holder device is mounted, the threaded seat 91 and the corresponding seat of the element 78 grip onto the jacket of the cord 4, which is thus locked in a threaded hole. The crests of the threads penetrate into the jacket so as to prevent displacement of the cord 4 with respect to the cord-holder device in the handle 1. The lower part 92 of the body 85 and the corresponding part of the body of the element 78 remain housed within the hole 3 of the handle while the lower faces of the lateral arms 87, 88 of the element 77 and the corresponding ones of the element 78 rest against the base 2 of the handle 1.

The semitubular part 86 and the corresponding part of the element 78 are placed together so as to form an inner hole aligned with the threaded hole formed by the threaded seats of the elements 77, 78. This inner hole has a diameter such that its surface does not grip the jacket of the cord 4. The upper end of the semitubular part 86 terminates with an outer surface 93 having the form of a semifrustoconical surface, with a lower base protruding with respect to the outer underlying surface of the semitubular part 86. Over the outer surface 93 defined by the semitubular part 86 and by the corresponding semitubular part of the element 78 there is placed a flexible rubber tube 94 which is locked by the frustoconical surface defined by the elements 77, 78. The tube 94 serves to rigidify the cord 4, avoiding possible breaks of its jacket in the immediate vicinity of the cord-holder device.

The structure of the cord-holder device is such as to prevent damage to the wires of the cord 4 and to prevent mechanical stresses exerted on the cord from the outside of the comparator from being transmitted to the part of the cord contained within the handle 1 and from this part of the cord to the movable arm 34.

As a matter of fact the two elements 77, 78 of the cord-holder device cannot move either axially, due to the teeth 89, 90, or transversely, due to being abutted against the tangs 71, 72.

The element 77 (and thus also the element 78) has an outer surface 95 which constitutes part of a cylindrical surface of a diameter corresponding to that of the base 2 of the handle, so that the transverse size of the cord-holder device and of the tangs 71, 72 is equal to that of the base 2. In the element 77 there is provided a hole 96 of substantially elliptical section, which communicates with a hole 97 provided in the upper base 2 of the handle 1. Another hole 98 provided in th base 2, symmetrical with respect to the hole 97 and adjacent, like hole 97, to the central hole 3 communicates with the hole provided in the element 78 corresponding to hole 96.

The presence of the holes 62, 96, 97, 98 makes it possible to clean the inside of the comparator without it being necessary to remove any part. As a matter of fact, by means of a nozzle inserted through the hole 62 it is possible to introduce air or other suitable fluid under pressure within the protective and support housing formed by the casing 13 with the plate 61, plate 6 and handle 1. The air flows within the plug substantially from the bottom to the top passing through the inside of the casing 13, the hole 63 and handle 1. The air flow removes any foreign matter and discharges towards the outside together with the foreign matter through the holes 96, 97, 98. The air discharges in part also through the free annular spaces defined by the cylinders 54, 55 and by the surfaces of the holes 59, 60. The simplicity of this cleaning operation is such that it can be repeated frequently in such a manner as to have assurance that the parts thereof critical for the operation, such as the cylinders 54, 55, the stop surfaces 66, 67, the arms 34, 35, the spring 40 and the portions 36, 37, do not accumulate foreign matter in such an amount as to jeopardize the precision and the reproducibility of the measurements, or cause oxidation of the surfaces. The transducer 41, being tightly closed by the gasket 49, does not suffer from this cleaning operation with compressed air.

The hole 3 in the handle 1 has a diameter such as to permit, after the disconnection of the connector 70 from the group 69, the dismounting of the cord-holder device and the unscrewing of the screws 7, 8, the withdrawal of the handle 1 by passing over the cord 4 and the connector 70. In this way the assembly and the disassembly of the comparator are facilitated and it is possible to assemble the comparator by easily and rapidly connecting its various assembled components together, one of which is the handle and another of which is the movable unit provided with transducer, cord and connector.

If mechanical stresses are applied to the handle 1 or to the part of the cord 4 which emerges from same through the cord-holder device, these stresses are not transmitted to the moving measurement unit since the stresses act only on the plate 6 and on the cord-holder device. This also is important from the standpoint of the reproducibility of the measurements effected by the comparator.

Figure 10:
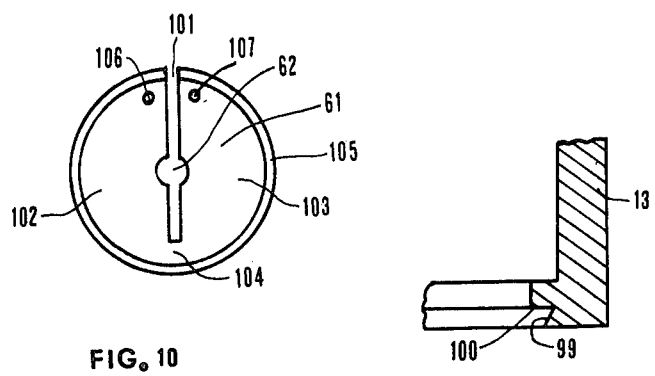
FIG. 10 is a plan view seen from below of a base plate of the comparator of FIG. 1.
Figure 11:
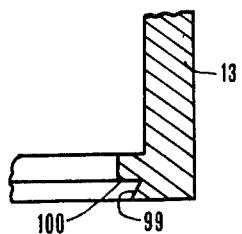
FIG. 11 shows, on a larger scale, a detail of the nose of the comparator of FIG. 1.

Referring to FIGS. 1, 10 and 11, there will now be described in detail the structure of the plate 61 and its connection to the casing 13.

The casing 13 is provided at its lower base with a frustoconical seat 99 above which there is an annular stop surface 100. The plate 61 has a cut 101 in diametral direction passing through the hole 62. The cut 101 divides the plate 61 into two adjacent portions 102, 103, connected by a third portion 104 having a length which is sufficiently limited so that the third portion 104 is elastically yieldable to permit bringing the adjacent portions 102, 103 together, thereby reducing the width of the free zone produced by the cut 101. The side surface 105 of the plate is of a frustoconical shape with minimum and maximum diameters slightly greater (in condition of rest of the portion 104) than the corresponding ones of the frustoconical seat 99. With a fork-shaped device, not shown, having two tines which are inserted into two holes 106, 107 provided in the two portions 102, 103 in the vicinity of the free end of the cut 101, the two portions 102, 103 can be brought together so as to be able to insert the plate 61 within the seat 99. Thereupon the device is acted on in such a manner as to permit the two portions 102, 103 to move away from each other. The device then is removed from the holes 106, 107, thus leaving the plate 61 clamped in the seat 99.

In the same manner it is possible to remove the plate 61 from the casing 13.

The structure of the plate 61 and the system for the fitted connection between the casing 13 and the plate 61 are therefore very simple and economical and make it possible to effect the assembly and disassembly operations with great speed, facilitating access to the inside of the casing 13 and in particular to the screws 58. The width of the cut 101 may be sufficiently small so that the presence of the cut 101 does not appreciably affect the cleaning operation described above.

What is claimed is:

1. A gauge for checking linear sizes of mechanical parts, comprising: a support; an integral member including a first section coupled to the support, two resiliently flexible sections connected to the first section and defining relevant fulcrum devices; two further sections, each defining a relevant movable arm, connected to the flexible sections for rotation movement about the relevant fulcrum devices; two feelers coupled to the movable arms, respectively, for contacting the part to be checked; and transducer means coupled to the movable arms for providing a signal responsive to the mutual position of the movable arms, the transducer means including two transducer parts coupled to the movable arms, respectively, each transducer part and each feeler being coupled to the relevant movable arm on the same side with respect to the relevant fulcrum device, wherein the gauge further includes a protective nosepiece substantially housing the movable arms and having an open end defining a seat, said support being substantially a plate defining first and second sides and at least a through hole, the moving arms passing through the plate, and wherein the gauge also includes a substantially circular closure base plate adapted to be coupled to said seat, the base plate having a cut substantially in diametral direction which divides it into two adjacent portions connected by a third portion, the third portion being elastically yieldable to permit bringing the first two portions together to insert the base plate in said seat and effect the fitted connection of the base plate in the seat.

2. The gauge according to claim 1, wherein: said cut has a closed end corresponding to a side of the third portion and a free end; said seat has a substantially frusto-conical shape; the base plate has a side surface which is also of a substantially frusto-conical shape, with a corresponding opening at the free end of the cut; the nosepiece has a stop surface for the base plate, the stop surface being adjacent to the seat; said base plate further has two holes provided in said adjacent portions, in the vicinity of the free end of the cut, for bringing the first two portions together by means of a tool cooperating with the surfaces of said holes for the insertion of the base plate into the seat and its removal from the seat.

3. The gauge according to claim 1, further including: a cord connected to the transducer means; a connector connected to one end of the cord to connect the cord to a supply, detection and indication unit; a handle; first connection means for fastening the handle to the support plate and for permitting disconnection of the handle from the support plate; a locking device defining a surface adapted to lock a portion of the cord; second connection means for fastening the locking device to the handle at an external position thereof and for permitting disconnection of the locking device from the handle and the cord; wherein said handle has an opening for the passage of the cord, this opening being sufficiently wide to permit the passage of the handle over the cord and the connector.

4. A manual plug gauge for checking the diameter of holes of mechanical parts, comprising:

a support plate defining first and second sides and at least a through hole;

an integral body including: a first section coupled to the support plate; two resiliently flexible sections connected to the first section and defining relevant fulcrum devices; and two further sections, each defining a relevant movable arm, connected to the flexible sections for rotation movement about the relevant fulcrum devices;

two feelers coupled to the movable arms, respectively, for contacting the part to be checked;

transducer means coupled to the movable arms for providing a signal responsive to the mutual position of the movable arms, the transducer means including two transducer parts coupled to the movable arms, respectively, each transducer part and each feeler being coupled to the relevant movable arm on the same side with respect to the relevant fulcrum device;

a hollow handle coupled to the support plate;

a protective nosepiece coupled to the support plate and defining with the handle a geometrical longitudinal axis of the plug gauge, the nosepiece substantially housing the arms, the arms being substantially arranged along said longitudinal axis and passing through said through hole of the support plate, the nosepiece further defining two openings for the passage of the feelers;

wherein the handle, the support plate and the nosepiece define an internal chamber and the handle and the nosepiece have bases spaced along said longitudinal axis, these bases defining further openings for carrying out a cleaning operation inside said chamber by introduction of a pressurized fluid through one of said further openings, the flow of the fluid within the chamber, substantially along said longitudinal axis, for removing any foreign matter, and the discharge of the fluid to the outside of the plug gauge, and wherein one of the bases of the nosepiece has an open end defining a seat and the plug gauge further comprises a substantially circular closure base plate adapted to be coupled to said seat, the base plate having a cut substantially in diametral direction which divides it into two adjacent portions connected by a third portion, the third portion being elastically yieldable to permit bringing the first two portions of the base plate together to insert the base plate in said seat and effect the fitted connection of the base plate in the seat.

* * * * *